(12) United States Patent
Handa et al.

(10) Patent No.: US 9,772,021 B2
(45) Date of Patent: Sep. 26, 2017

(54) ROTARY ACTUATOR AND STRAIN WAVE GEARING REDUCTION DRIVE UNIT

(71) Applicant: HARMONIC DRIVE SYSTEMS INC., Shinagawa-ku, Tokyo (JP)

(72) Inventors: Jun Handa, Azumino (JP); Yu Nakagawa, Azumino (JP); Yoshihide Kiyosawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 14/910,340

(22) PCT Filed: Aug. 6, 2013

(86) PCT No.: PCT/JP2013/071271
§ 371 (c)(1),
(2) Date: Feb. 5, 2016

(87) PCT Pub. No.: WO2015/019420
PCT Pub. Date: Feb. 12, 2015

(65) Prior Publication Data
US 2016/0178045 A1 Jun. 23, 2016

(51) Int. Cl.
*F16H 49/00* (2006.01)
(52) U.S. Cl.
CPC .................. *F16H 49/001* (2013.01)
(58) Field of Classification Search
CPC ...................................... F16H 49/001
(Continued)

(56) References Cited

U.S. PATENT DOCUMENTS 3,986,412 A * 10/1976 Farley ................. F16H 49/001
475/2
4,716,785 A * 1/1988 Godai .................... B25J 9/0081
74/606 R
(Continued)

FOREIGN PATENT DOCUMENTS

JP      59-121255    *   7/1984
JP      3-27781 B2     4/1991
(Continued)

OTHER PUBLICATIONS

International Search Report (PCT/ISA/210) dated Oct. 10, 2013, by the Japanese Patent Office as the International Searching Authority for International Application No. PCT/JP2013/071271.

*Primary Examiner* — William C Joyce
(74) *Attorney, Agent, or Firm* — Buchanan Ingersoll & Rooney PC

(57) ABSTRACT

A reduction drive-side mounting end face on a strain wave gearing reduction drive unit has a circular center hole, and a motor-side mounting end face on a motor has a circular projection. The strain wave gearing reduction drive unit and motor are coaxially mounted by the circular projection being fit into the circular center hole with a regulating ring therebetween. The regulating ring, which regulates the motion of a flexible external gear, can be easily mounted to the strain wave gearing reduction drive unit by using the motor. The strain wave gearing reduction drive unit can be mounted to a motor comprising a circular projection with a different outer diameter by using a regulating ring with a different inner diameter.

5 Claims, 2 Drawing Sheets

(58) Field of Classification Search
USPC .................................. 74/421 A, 640, 606 R
See application file for complete search history.

(56) References Cited

U.S. PATENT DOCUMENTS

2007/0129207 A1* 6/2007 Kanamori .............. H02K 11/24
475/331
2013/0065725 A1 3/2013 Matsuda et al.

FOREIGN PATENT DOCUMENTS

| JP | 4-38123 Y2 | 9/1992 |
| JP | 8-317594 * | 11/1996 |
| JP | 9-116280 A | 5/1997 |
| JP | 2000-120812 A | 4/2000 |
| JP | 2004-009981 A | 1/2004 |
| JP | 2013-057369 A | 3/2013 |

* cited by examiner

ROTARY ACTUATOR AND STRAIN WAVE GEARING REDUCTION DRIVE UNIT

TECHNICAL FIELD

The present invention relates to a rotary actuator comprising a strain wave gearing reduction drive unit and a motor. Specifically, the present invention relates to a strain wave gearing reduction drive unit comprising a mechanism for regulating axial-direction movement of a flexible externally toothed gear of the strain wave gearing reduction drive unit.

BACKGROUND ART

Rotary actuators configured from a flat strain wave gearing reduction drive and a motor are known in the art. A flat strain wave gearing reduction drive comprises a cylindrical flexible externally toothed gear. One axial-direction side of the flexible externally toothed gear meshes with a stationary-side rigid internally toothed gear having a different number of teeth, and the other axial-direction side meshes with a drive-side rigid internally toothed gear having the same number of teeth as the flexible externally toothed gear. Thrust acts on the flexible externally toothed gear when the flat strain wave gearing reduction drive is in operation, and the flexible externally toothed gear moves in the axial direction. Therefore, it is necessary to arrange a regulating member for regulating axial-direction movement of the flexible externally toothed gear.

Patent Document 1 proposes a steering device incorporating a rotary actuator that comprises a flat strain wave gearing reduction drive. In Patent Document 1, a protective plate that is press-fitted and secured to a stationary-side rigid internally toothed gear is arranged between a motor housing and a flexible externally toothed gear that are mutually opposed along the axial direction. The protective plate prevents the flexible externally toothed gear from moving in the axial direction and interfering with the motor housing.

PRIOR ART DOCUMENTS

Patent Documents

Patent Document 1: JP 2004-9981A

SUMMARY OF THE INVENTION

Problems to be Solved by the Invention

In a flat strain wave gearing reduction drive configured such that a regulating member is press-fitted and secured to a stationary-side rigid internally toothed gear, it is necessary to perform a process for press-fitting and securing to the stationary-side rigid internally toothed gear. It is also necessary to process a press-fitting/securing part on the regulating member. This increases the number of steps for press-fitting and securing the regulating member to the stationary-side rigid internally toothed gear, which commensurately complicates the operation for assembling the strain wave gearing reduction drive unit. The disassembly operation for maintenance, inspection, and the like is similarly complicated.

However, there are also cases in which a flat strain wave gearing reduction drive is provided to a user as a unit assembled in a unit housing. On the user side, a rotary actuator is configured such that the strain wave gearing reduction drive unit is assembled on a motor. In order to assemble the strain wave gearing reduction drive unit and the motor, a circular recess is formed in an attachment surface on the side of the strain wave gearing reduction drive unit so as to surround a motor shaft of the motor to be connected, and a circular protrusion capable of fitting in the circular recess is formed in another attachment surface on the motor side. In order to make it possible to assemble the strain wave gearing reduction drive unit on various motors, it is necessary to prepare a strain wave gearing reduction drive unit comprising a circular recess of a size corresponding to the circular protrusion formed in various motor attachment surfaces.

An object of the present invention is to provide a rotary actuator comprising a strain wave gearing reduction drive unit in which a regulating member for regulating axial-direction movement of a flexible externally toothed gear can easily be mounted by utilizing a motor.

Another object of the present invention is to provide a rotary actuator comprising a strain wave gearing reduction drive unit that can easily be attached to various motors using a regulating member that can be mounted by utilizing the motors.

Means to Solve the Problems

In order to achieve the objects described above, the rotary actuator of the present invention is configured as described below. The reference symbols in parentheses indicate corresponding portions in an embodiment of the present invention; these reference symbols are given in order to facilitate understanding, and are in no way intended to limit the present invention to this embodiment.

Specifically, the rotary actuator (1) of the present invention has a strain wave gearing reduction drive unit (10), a motor (30), and a regulating ring (40). The strain wave gearing reduction drive unit (10) comprises a reduction-drive-side attachment end surface (15) to which the motor (30) is attached, and a circular center hole (16) formed in the reduction-drive-side attachment end surface (15). The motor (30) comprises a motor-side attachment end surface (33) that comes into contact with the reduction-drive-side attachment end surface (15), and a circular protruding portion (34) formed on the motor-side attachment end surface (33). The motor (30) is coaxially assembled on the strain wave gearing reduction drive unit (10) with the regulating ring (40) fitted between the outer-peripheral surface of the circular protruding portion (34) and the inner-peripheral surface of the circular center hole (16). The regulating ring (40) regulates movement, in the direction of a center axis (1a), of a cylindrical flexible externally toothed gear (25) built into the strain wave gearing reduction drive unit.

In the rotary actuator of the present invention, the regulating ring is mounted on the strain wave gearing reduction drive unit by utilizing the motor assembled on the reduction-drive-side attachment surface of the strain wave gearing reduction drive unit. It is unnecessary to process a press-fit portion or the like for securing the regulating ring to a first rigid internally toothed gear, a unit housing, or the like. Additionally, when removing the strain wave gearing reduction drive unit from the motor, it is possible to easily remove the regulating ring mounted in the circular center hole in the reduction-drive-side attachment surface of the strain wave gearing reduction drive unit.

The strain wave gearing reduction drive unit (10) can be configured so as to comprise: a unit housing (11) that comprises the reduction-drive-side attachment end surface

(15) and the circular center hole (16); a first rigid internally toothed gear (21) coaxially arranged inside the unit housing (11); a second rigid internally toothed gear (22) coaxially arranged inside the unit housing (11), the second rigid internally toothed gear (22) being positioned relative to the first rigid internally toothed gear (21) so as to be on the opposite side from the reduction-drive-side attachment end surface (15); the flexible externally toothed gear (25) coaxially arranged inside the first and second rigid internally toothed gears (21, 22), the flexible externally toothed gear (25) being capable of meshing with the first and second rigid internally toothed gears (21, 22); and a wave generator (26) mounted inside the flexible externally toothed gear (25), the wave generator (26) causing the flexible externally toothed gear (25) to flex into a non-circular shape and partially mesh with each of the first and second rigid internally toothed gears (21, 22) at a plurality of positions in the circumferential direction.

In this case, one motor-side end surface (43) of the regulating ring (40) comes into contact with the motor-side attachment end surface (33). The outer-peripheral-side portion of another reduction-drive-side end surface (44) of the regulating ring (40) comes into contact with an end surface of the first rigid internally toothed gear (21) that faces toward the motor, and the inner-peripheral-side portion of the reduction-drive-side end surface (44) opposes a first end surface of the flexible externally toothed gear (25) that faces toward the motor (30).

A configuration can be adopted such that, when the strain wave gearing reduction drive unit (10) has an output member (23) secured to or formed integrally with the second rigid internally toothed gear (21), the output member (23) comprises an end surface (23c) that opposes a second end surface of the flexible externally toothed gear (25), the second end surface being positioned on an opposite side from the first end surface. The end surface makes it possible to regulate movement of the flexible externally toothed gear in a direction away from the regulating ring along the center-axis direction.

The strain wave gearing reduction drive unit (10) of the present invention has: a unit housing (11) comprising a reduction-drive-side attachment end surface (15) to which a motor (30) is attached; a circular center hole (16) formed in the reduction-drive-side attachment end surface (15); a regulating ring (40) capable of being mounted in the circular center hole (16); a first rigid internally toothed gear (21) coaxially arranged inside the unit housing (11); a second rigid internally toothed gear (22) coaxially arranged inside the unit housing (11), the second rigid internally toothed gear (22) being positioned relative to the first rigid internally toothed gear (21) so as to be on the opposite side from the reduction-drive-side attachment end surface (15); a cylindrical flexible externally toothed gear (25) coaxially arranged inside the first and second rigid internally toothed gears (21, 22), the flexible externally toothed gear (25) being capable of meshing with the first and second rigid internally toothed gears (21, 22); and a wave generator (26) mounted inside the flexible externally toothed gear (25), the wave generator (26) causing the flexible externally toothed gear (25) to flex into a non-circular shape and partially mesh with each of the first and second rigid internally toothed gears (21, 22). When the regulating ring (40) is fitted in the circular center hole (16), one motor-side end surface (43) of the regulating ring (40) is positioned on the same plane as the reduction-drive-side attachment end surface (15), the outer-peripheral-side portion of another reduction-drive-side end surface (44) of the regulating ring (40) comes into contact with the first rigid internally toothed gear (21) from the center-axis (1a) direction, and the inner-peripheral-side portion of the reduction-drive-side end surface (44) opposes the flexible externally toothed gear from the center-axis (1a) direction.

MODE FOR CARRYING OUT THE INVENTION

An embodiment of a rotary actuator to which the present invention is applied will be described below with reference to the drawings.

Figure 1:
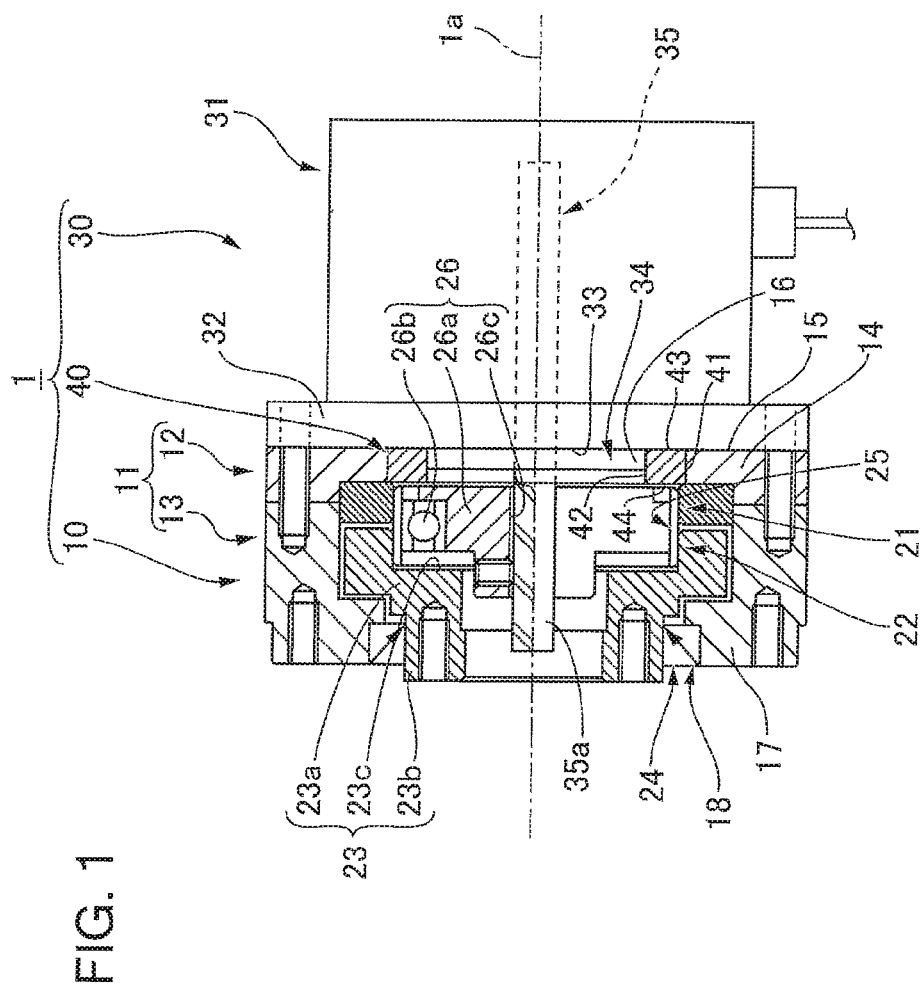
FIG. 1 is a schematic view showing a rotary actuator to which the present invention is applied.
Figure 2:
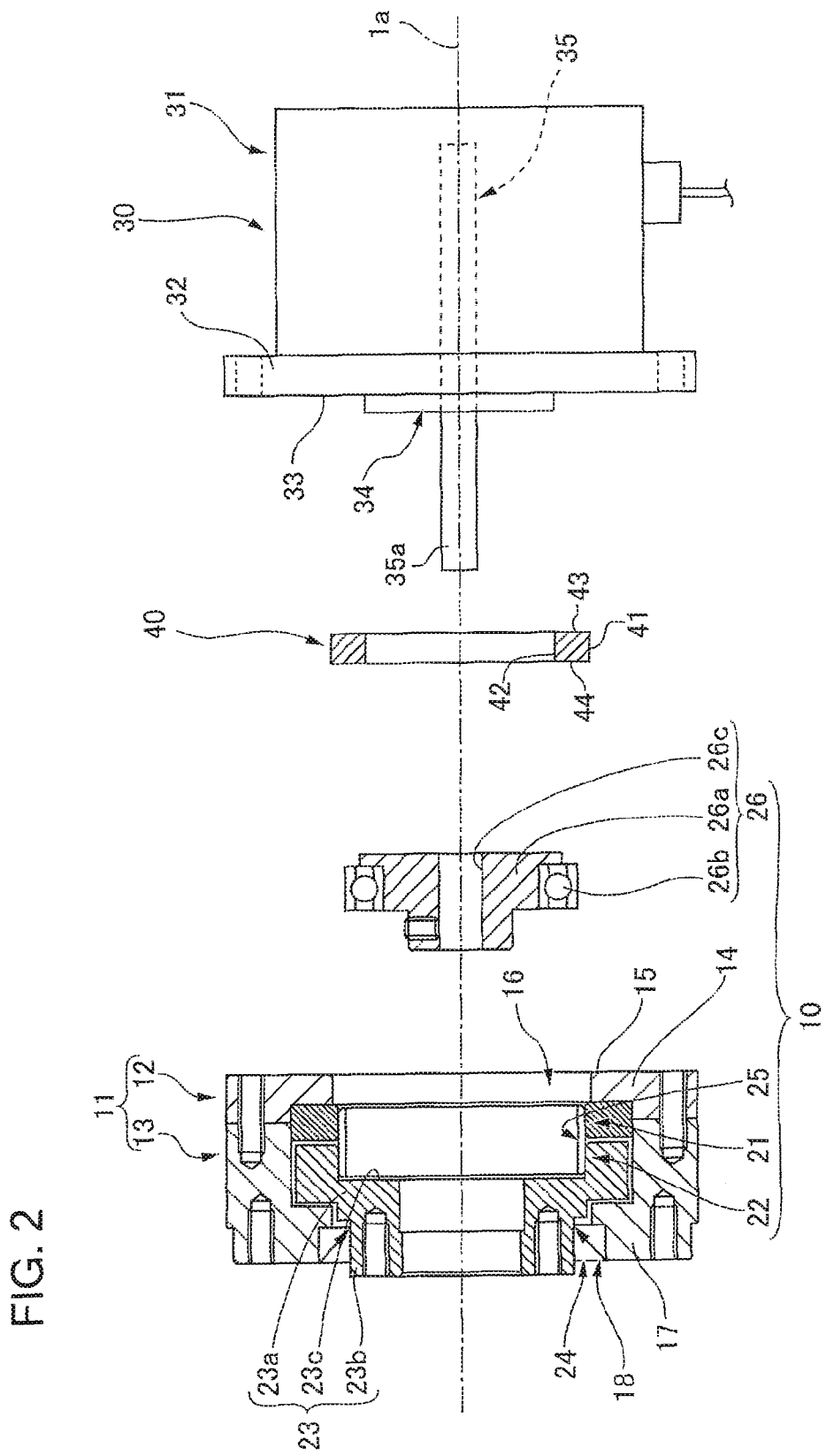
FIG. 2 is a schematic view showing a state in which the constituent components of the rotary actuator of FIG. 1 are separated.

FIG. 1 is a schematic view showing a rotary actuator according to the present embodiment, and FIG. 2 is a schematic view showing a state in which the constituent components thereof are separated. The rotary actuator 1 has a strain wave gearing reduction drive unit 10, a motor 30 coaxially attached to the strain wave gearing reduction drive unit 10, and a regulating ring 40 mounted between the strain wave gearing reduction drive unit 10 and the motor 30. In FIG. 1, a portion of the strain wave gearing reduction drive unit 10 is shown in cross-section. In the following description, the side of the strain wave gearing reduction drive unit 10 near the motor 30 along the center-axis 1a direction is referred to as an input side, and the side of the strain wave gearing reduction drive unit 10 away from the motor 30 is referred to as an output side.

The strain wave gearing reduction drive unit 10 comprises a cylindrical unit housing 11. The unit housing 11 is configured from a substantially discoid input-side housing 12 positioned on the side near the motor 30, and a cylindrical output-side housing 13 positioned on the opposite side.

The input-side housing 12 comprises an input-side end plate portion 14 of fixed thickness, the input-side end plate portion 14 extending in a direction orthogonal to the center axis 1a. An outside end surface of the input-side end plate portion 14 that faces toward the input side is a reduction-drive-side attachment end surface 15 to which the motor 30 is attached, the reduction-drive-side attachment end surface 15 being a flat end surface extending in a direction orthogonal to the center axis 1a. A circular center hole 16 extending through the input-side end plate portion 14 is formed in the reduction-drive-side attachment end surface 15.

An outside end part of the output-side housing 13 that faces toward the output side is an output-side end plate portion 17 extending in a direction orthogonal to the center axis 1a. A circular center hole 18 extending through the output-side end place portion 17 is formed in the output-side end plate portion 17.

An annular first rigid internally toothed gear 21 and an annular second rigid internally toothed gear 22 are coaxially arranged in parallel inside the unit housing 11. The first rigid internally toothed gear 21 is a stationary-side rigid internally toothed gear arranged on the input side, and is secured to the input-side housing 12. The second rigid internally toothed gear 22 is a drive-side rigid internally toothed gear arranged on the output side with respect to the first rigid internally toothed gear 21.

A hollow output shaft 23 is formed integrally with the output side of the second rigid internally toothed gear 22.

Specifically, the second rigid internally toothed gear 22 and the hollow output shaft 23 are formed from a single member. These components can be manufactured as separate members and coaxially secured. An input-side rear end part of the hollow output shaft 23 is formed as a flange 23a of large diameter, an outer-peripheral end surface part of the flange 23a being linked to the second rigid internally toothed gear 22. An output-side shaft portion 23b of the hollow output shaft 23 protrudes toward the output side through the circular center hole 18 formed in the output-side housing 13. The space between the outer-peripheral surface of the shaft portion 23b and the circular inner-peripheral surface of the circular center hole 18 is sealed by an annular oil seal 24.

A cylindrical flexible externally toothed gear 25 is coaxially arranged inside the first and second rigid internally toothed gears 21, 22, which are arranged in parallel. The flexible externally toothed gear 25 is capable of meshing with both of the first and second rigid internally toothed gears 21, 22. The number of teeth of the flexible externally toothed gear 25 is equal to the number of teeth of the drive-side second rigid internally toothed gear 22, and is 2n less than the number of teeth of the stationary-side first rigid internally toothed gear 21 (where n is a positive integer), generally 2 less.

An ellipsoidally contoured wave generator 26 is mounted inside the flexible externally toothed gear 25. The wave generator 26 comprises an ellipsoidally contoured rigid plug 26a of fixed thickness, and a wave bearing 26b mounted on the ellipsoidal outer-peripheral surface of the rigid plug 26a. The wave bearing is a ball bearing comprising a flexible bearing ring capable of radially flexing. The flexible externally toothed gear 25 is caused by the wave generator 26 to ellipsoidally flex, the flexible externally toothed gear 25 partially meshing with the first and second rigid internally toothed gears 21, 22 at both end positions along the major axis of the ellipsoidal shape. When the wave generator 26 rotates, the meshing positions move in the circumferential direction. The flexible externally toothed gear 25, which has fewer teeth, rotates integrally with the drive-side second rigid internally toothed gear 22 with respect to the stationary-side first rigid internally toothed gear 21, which has more teeth. Rotation of the second rigid internally toothed gear 22 is delivered from the hollow output shaft 23 and transmitted to a load-side member (not shown).

The motor 30 comprises a cylindrical motor housing 31, a flange 32 of large diameter being formed in the front end part of the motor housing 31. The front end surface of the flange 32 is a motor-side attachment end surface 33 that comes into contact with the reduction-drive-side attachment end surface 15, the motor-side attachment end surface 33 being a flat surface orthogonal to the center axis 1a. A circular protruding portion 34 that protrudes by a prescribed amount toward the reduction-drive side is formed in the center portion of the motor-side attachment end surface 33. A distal-end-side shaft part 35a of a motor shaft 35 protrudes from the center of the circular protruding portion 34. The distal-end-side shaft part 35a extends through a shaft hole 26c formed in the rigid plug 26a of the wave generator 26, and is secured to the wave generator 26.

The regulating ring 40 is of rectangular cross-section, and comprises a circular outer-peripheral surface 41, a circular inner-peripheral surface 42, an input-side end surface 43, and an output-side end surface 44. The outside diameter of the circular outer-peripheral surface 41 corresponds to the inside diameter of the circular inner-peripheral surface of the circular center hole 16 formed in the reduction-drive-side attachment end surface 15 of the strain wave gearing reduction drive unit 10, and the inside diameter of the circular inner-peripheral surface 42 corresponds to the outside diameter of the circular outer-peripheral surface of the circular protruding portion 34 of the motor-side attachment end surface 33. The regulating ring 40 having these dimensions is fitted in the annular gap formed between the circular inner-peripheral surface of the circular center hole 16 and the circular outer-peripheral surface of the circular protruding portion 34.

When the regulating ring is fitted between the circular center hole 16 and the circular protruding portion 34, the input-side end surface 43, which is the motor-side end surface, of the regulating ring 40 makes contact with the motor-side attachment end surface 33. The outer-peripheral-side portion of the output-side end surface 44, which is the other reduction-drive-side end surface, of the regulating ring 40 makes contact with the input-side end surface of the first rigid internally toothed gear 21 that faces toward the motor 30. The inner-peripheral-side portion of the output-side end surface 44 opposes a first end surface of the flexible externally toothed gear 25 that faces toward the motor, a nominal gap being interposed between the inner-peripheral-side portion and the first end surface.

An end surface 23c of the flange 23a of the hollow output shaft 23 formed integrally with the second rigid internally toothed gear 22 opposes a second end surface of the flexible externally toothed gear 25 near the output side, a nominal gap being interposed between the end surface 23c and the second end surface.

The rotary actuator 1 configured in this manner is assembled as described below. First, the regulating ring 40 is assembled on the circular protruding portion 34 of the motor 30, and the wave generator 26 is assembled on the motor shaft 35 in this state. The wave generator 26 assembled on the motor shaft 35 is coaxially fitted inside the flexible externally toothed gear 25 of the strain wave gearing reduction drive unit 10. The wave generator 26 is fitted such that the motor-side attachment end surface 33 comes into contact with the reduction-drive-side attachment end surface 15. As a result, the regulating ring 40 assembled on the motor-side circular protruding portion 34 is fitted to the circular inner-peripheral surface of the circular center hole 16 of the reduction-drive-side attachment end surface 15, and the motor 30 and the strain wave gearing reduction drive unit 10 are coaxially assembled. After assembly, the motor housing 31 and the unit housing 11 are fastened and secured by fastening bolts (not shown).

In this assembled state, the one motor-side end surface 43 of the regulating ring 40 is positioned on the same plane as the reduction-drive-side attachment end surface 15, the motor-side end surface 43 coming into contact with the motor-side attachment end surface 33. The outer-peripheral-side portion of the other reduction-drive-side end surface 44 of the regulating ring 40 comes into contact with an inner-peripheral edge portion of the end surface of the first rigid internally toothed gear 21 that faces toward the motor 30. The inner-peripheral-side portion of the reduction-drive-side end surface 44 opposes the end surface of the flexible externally toothed gear 25 that faces toward the motor 30, a nominal gap being interposed between the inner-peripheral-side portion and the end surface.

The flexible externally toothed gear 25 tends to move in the direction of the center axis 1a when the rotary actuator 1 is in operation. The output-side end surface 44 of the regulating ring 40 is positioned on the input side of the flexible externally toothed gear 25 with respect to the direction of the center axis 1a, and the end surface 23c of the hollow output shaft 23 is positioned on the output side with respect to the direction of the center axis 1a. Therefore, when the flexible externally toothed gear 25 moves toward the input side, the end of the flexible externally toothed gear 25 comes into contact with the regulating ring 40, and the movement of the flexible externally toothed gear 25 is regulated. Similarly, when the flexible externally toothed gear 25 moves in the opposite direction, the other end of the flexible externally toothed gear 25 comes into contact with the end surface 23c of the hollow output shaft 23, and the movement of the flexible externally toothed gear 25 is regulated.

It will suffice merely for the regulating ring 40 for regulating axial-direction movement of the flexible externally toothed gear 25 to be fitted between the motor 30 and the strain wave gearing reduction drive unit 10 when assembled on the motor 30. Therefore, unlike when the regulating ring 40 is press-fitted or otherwise secured to the unit housing 11 or the first rigid internally toothed gear 21, assembly and disassembly operations are easy to perform. Additionally, the regulating ring 40 may have a simple shape, it being unnecessary to process a securing part for press-fitting or otherwise securing the regulating ring 40 to the unit housing 11 or the first rigid internally toothed gear 21.

Furthermore, the circular protruding portion 34 formed on the motor-side attachment end surface 33 of the motor 30 is fitted to the circular inner-peripheral surface of the regulating ring 40. Therefore, when the strain wave gearing reduction drive unit 10 is assembled on various different types of motors, it is sufficient to attach a regulating ring 40 having an inside diameter that corresponds to the outside diameter of the circular protruding portion 34 of the motor, which is an object to be assembled. This makes it possible to have the inside diameter of the regulating ring 40 correspond to motors having motor-side attachment end surfaces that comprise circular protruding portions 34 of different outside diameters, merely by changing only the regulating ring 40. Accordingly, it is possible to increase the utility of the strain wave gearing reduction drive unit 10 without significantly changing the design thereof.

The invention claimed is:

1. A rotary actuator comprising:
   a strain wave gearing reduction drive unit;
   a motor; and
   a regulating ring; wherein
   the strain wave gearing reduction drive unit has a reduction-drive-side attachment end surface to which the motor is attached, and a circular center hole formed in the reduction-drive-side attachment end surface;
   the motor has a motor-side attachment end surface that comes into contact with the reduction-drive-side attachment end surface, and a circular protruding portion formed on the motor-side attachment end surface;
   the motor is coaxially assembled on the strain wave gearing reduction drive unit with the regulating ring fitted between an outer-peripheral surface of the circular protruding portion and an inner-peripheral surface of the circular center hole; and
   the regulating ring for regulating movement, in a direction of a center axis, of a cylindrical flexible externally toothed gear built into the strain wave gearing reduction drive unit,
   wherein the regulating ring has a reduction-drive-side end surface facing toward the flexible externally toothed gear in the direction of the center axis, and the reduction-drive-side end surface opposes a first end surface of the flexible externally toothed gear that faces toward the motor, a nominal gap in the direction of the center axis being interposed between the reduction-drive-side end surface and the first end surface.

2. The rotary actuator according to claim 1, wherein the strain wave gearing reduction drive unit comprises:
   a unit housing that has the reduction-drive-side attachment end surface and the circular center hole;
   a first rigid internally toothed gear coaxially arranged inside the unit housing;
   a second rigid internally toothed gear coaxially arranged inside the unit housing, the second rigid internally toothed gear being positioned relative to the first rigid internally toothed gear so as to be on an opposite side from the motor-side-attachment end surface;
   the flexible externally toothed gear coaxially arranged inside the first and second rigid internally toothed gears, the flexible externally toothed gear being capable of meshing with the first and second rigid internally toothed gears; and
   a wave generator mounted inside the flexible externally toothed gear, the wave generator causing the flexible externally toothed gear to flex into a non-circular shape and partially mesh with each of the first and second rigid internally toothed gears at a plurality of positions in a circumferential direction, and wherein
   the regulating ring has a motor-side end surface facing toward the motor, the motor-side end surface coming into contact with the motor-side attachment end surface;
   an outer-peripheral-side portion of the reduction-drive-side end surface of the regulating ring comes into contact with an end surface of the first rigid internally toothed gear that faces toward the motor; and
   an inner-peripheral-side portion of the reduction-drive-side end surface opposes the first end surface of the flexible externally toothed gear that faces toward the motor with the nominal gap.

3. The rotary actuator according to claim 2, wherein the strain wave gearing reduction drive unit has an output member secured to or formed integrally with the second rigid internally toothed gear, and
   the output member has an end surface that opposes a second end surface of the flexible externally toothed gear, the second end surface being positioned on an opposite side from the first end surface.

4. A strain wave gearing reduction drive unit comprising:
   a unit housing having a reduction-drive-side attachment end surface to which a motor is attached;
   a circular center hole formed in the reduction-drive-side attachment end surface;
   a regulating ring capable of being mounted in the circular center hole;
   a first rigid internally toothed gear coaxially arranged inside the unit housing;
   a second rigid internally toothed gear coaxially arranged inside the unit housing, the second rigid internally toothed gear being positioned relative to the first rigid internally toothed gear so as to be on the opposite side from the reduction-drive-side attachment end surface;
   a cylindrical flexible externally toothed gear coaxially arranged inside the first and second rigid internally toothed gears, the flexible externally toothed gear being capable of meshing with the first and second rigid internally toothed gears; and
   a wave generator mounted inside the flexible externally toothed gear, the wave generator causing the flexible externally toothed gear to flex into a non-circular shape and partially mesh with each of the first and second rigid internally toothed gears; wherein when the regulating ring is fitted in the circular center hole, one motor-side end surface of the regulating ring is positioned on a same plane as the reduction-drive-side attachment end surface, an outer-peripheral-side portion of another reduction-drive-side end surface of the regulating ring comes into contact with the first rigid internally toothed gear from a center-axis direction, and an inner-peripheral-side portion of the another reduction-drive side end surface opposes a first end surface of the flexible externally toothed gear that faces toward the motor, in the center-axis direction such that a nominal gap being formed between the inner-peripheral-side portion and the first end surface.

5. The strain wave gearing reduction drive unit according to claim 4, further comprising an output member secured to or formed integrally with the second rigid internally toothed gear, and the output member has an end surface that opposes the flexible externally toothed gear from an opposite side with respect to the regulating ring in the center-axis direction.

* * * * *